Feb. 15, 1966   J. R. WHANGER   3,235,316
JOURNAL BEARING WITH ALTERNATING SURFACE AREAS OF
WEAR RESISTANT AND ANTI-GALLING MATERIALS
Filed April 22, 1963   7 Sheets-Sheet 1

FIGURE 1  PRIOR ART ROCK BIT

JAMES R. WHANGER
INVENTOR.

BY Roy H. Smith, Jr.
ATTORNEY

JAMES R. WHANGER
INVENTOR.

BY Roy H. Smith, Jr.
ATTORNEY

Feb. 15, 1966  J. R. WHANGER  3,235,316
JOURNAL BEARING WITH ALTERNATING SURFACE AREAS OF
WEAR RESISTANT AND ANTI-GALLING MATERIALS
Filed April 22, 1963  7 Sheets-Sheet 3

JAMES R. WHANGER
INVENTOR.

BY *Roy H. Smith, Jr.*
ATTORNEY

FIGURE 11

WEAR COMPARISON

BUSHING WITH INLAYS VS. STANDARD BUSHING

United States Patent Office 3,235,316
Patented Feb. 15, 1966

3,235,316
JOURNAL BEARING WITH ALTERNATING SURFACE AREAS OF WEAR RESISTANT AND ANTI-GALLING MATERIALS
James R. Whanger, Houston, Tex., assignor to Hughes Tool Company, Houston, Tex., a corporation of Delaware
Filed Apr. 22, 1963, Ser. No. 274,578
20 Claims. (Cl. 308—8.2)

The present invention relates to bearing structures, in particular those commonly classified as friction or journal bearings. While described here in connection with earth penetrating tools, especially rolling cone rock bits, it is to be understood that the bearing structures of the present invention can be used in other rotating machinery wherein its advantages may be exploited.

In mounting the rolling cones of rock bits on the stepped cylindrical bearing pins extending downwardly and inwardly from the rock bit head, the bearing structure currently employed almost universally is a combination of friction and anti-friction bearings, the latter typically being a set of rollers and a set of balls disposed in mating raceways in cone and bearing pin to absorb the brunt of the radial load, although the balls also resist thrust loads axially of the assembly and serve the added function of locking the cone on its bearing pin. The friction bearings of such assemblies take the form of a bushing force fitted into the cone and disposed to bear against the smaller, lowermost step or pilot pin portion of the bearing pin to absorb radial loading, and a thrust button pressed into the innermost part of the cone to bear against the unsupported outer end of such pilot pin. The shoulder between the pilot pin and the larger, base portion of the bearing pin also serves as a thrust surface in many designs, and is commonly referred to as a thrust flange.

While such bearing structures have served admirably in drilling most formations under the conditions generally met, they do have some disadvantages. For one thing, the roller raceways will sometimes fail in fatigue before the cutting structure of some bits is completely dulled, especially in those bits employed in hard formation drilling which use for the cutting structure cylindrical inserts of compacted tungsten carbide introduced to the trade by Hughes Tool Company under its "Hugheset" trademark, such bits being exemplified in the U.S. patent to Morlan et al., 2,687,875. A second disadvantage, one particularly associated with roller bearings, lies in the fact that the raceway space to accommodate the rollers can only be obtained by sacrificing bearing pin metal, cone shell thickness, or a combination of both. This disadvantage is responsible for many attempts to eliminate roller bearings and return to the journal bearings prevalent in the early years of the oil tool industry, bearings which were abandoned in favor of the composite type mentioned above because they could not be kept lubricated long enough to endure for the full life of the improved cutting structures introduced near the end of the early period.

With respect to the bushing and thrust button (together called the "nose bearing") mentioned above, little difficulty was experienced so long as the bits involved were used with the drilling muds employed almost exclusively until quite recently. With the advent of air and other gases as feasible drilling fluids, the bearing surfaces of some bushings as previously fabricated began to wear at uncommonly rapid rates. Whereas previously the circumferential surface of the bushings had worn so slowly as to stabilize the assembly even though there may have been considerably more wear of the anti-friction bearings, in the new fluids both types of bearings wore rapidly and the cutter became loose on its bearing pin, causing cocking and wobbling which in time caused interference with adjacent cones, resulting in skidding and other malfunctions.

In the aforementioned attempts to substitute a journal bearing for the rollers commonly used in modern rock bits, it seems to have been a common assumption that each of the frictionally engaged surfaces must be of a single material having very high hardness. Thus Swart, in his 1952 U.S. Patents 2,595,903 and 2,595,904, discloses such hard materials as "Stellite" and "Stoodite," with Rockwell hardness of "C" 54 and 60.

Similarly, it has been assumed that each friction bearing surface of the bushing, pilot pin and thrust button should also be of a single, quite hard material. See, for instance, the U.S. patents to Schlumpf et al., 2,104,819, and Scott, 1,747,394 and 2,086,681, which disclose such materials as carburized steel, "Stellite," and tungsten carbide.

Journal bearing materials used in other rotating machinery, on the other hand, largely reflect the designer's view that at least one of the relatively rotatable surfaces must be a single soft material, e.g., the lead of Hobbs, 2,266,319, and the silver, lead or indium of Hobbs, 2,266,320. Vigne in 1,941,768, discloses a composite bearing surface in which there are alternate strips of two soft materials, bronze and Babbitt metal, likewise disclosed in Rohlfing, 962,166, and Delano, 627,685. The nearest approach to the composite bearing surfaces of the present invention disclosed in the prior art appears in the U.S. patents to Queneau and Mudge, 2,329,483, and 2,241,789, but these patents teach only a composite surface formed by coating a rough finished base material with a very thin coating of a somewhat softer material such as silver-cadmium alloys, and grinding the coating down to an extremely thin layer (0.001″) so that the "hills" of the rough base metal appear at the surface in a matrix of coating in what the patentees dub a "leopard skin" pattern. None of these prior art teachings have been found suitable to the purposes of the present invention.

As the prior art thus fails to teach or suggest suitable journal bearing structures, it is the primary object of the present invention to provide journal bearing structures combining the characteristics of wear resistance and resistance to either or both the overheating and galling to which such structures are subjected.

Another object is to provide an assembly in which a pair of relatively rotatable members are disposed so that at least a portion of one member is journaled to the other with at least one of the journaled surfaces combining the characteristics of abrasion resistance and resistance to overheating and galling.

A further object is to provide a friction nose bearing between the bearing pin and rolling cone of a rotary rock bit combining in at least one of the relatively rotating surfaces materials having the qualities of high wear resistance and resistance to overheating and galling.

An additional object is to provide such a friction nose bearing in which the cylindrical surface of the bushing which is press fitted in the cone and rotates with respect to the like cylindrical surface of the pilot pin is composed of materials making such surface resistant to both wear and overheating and galling when such bit is used with any mud, water, air or other drilling fluids.

Another important object is to provide a journal bearing structure for rolling cone rock bits to supplant the roller bearings heretofore commonly used in mounting such rolling cones on the associated bearing pins of such bits, such journal bearings having the characteristics of abrasion resistance and resistance to overheating and galling. Expressed in another way, the present invention aims to provide a rock bit in which the rolling cones are mounted on bearing pins with bearings which are almost entirely of the friction or journal type, anti-friction bearings being used only as an optional means of retaining the cones on the bearing pins, and in which the bearing surfaces have both high wear resistance and resistance to overheating and galling.

Other objects and advantages of this invention will become further apparent hereinafter and in the drawing, in which:

FIGURE 3A shows a groove in the form of a helix, which is an alternate slot configuration.

FIGURE 4A illustrates an application of the invention whereby the slots are machined through a layer of hard metal alloy, such as those commonly used in rock bit journal bearing surfaces having a cobalt or iron base.

In describing the invention, repeated references will be made to the bearings contained in earth boring drills, such as those illustrated in FIGURES 1 and 3. These structures were selected for application of the invention and for illustration because of the severe forces and operating conditions to which they are subjected, and because of the outstanding success the invention has produced when applied to these structures. The invention, however, is not limited to these but is applicable to all bearing surfaces. Nor should the invention be limited to the specific terminology contained herein, but should include all equivalents which operate in a similar manner to accomplish a similar purpose.

Figure 1:
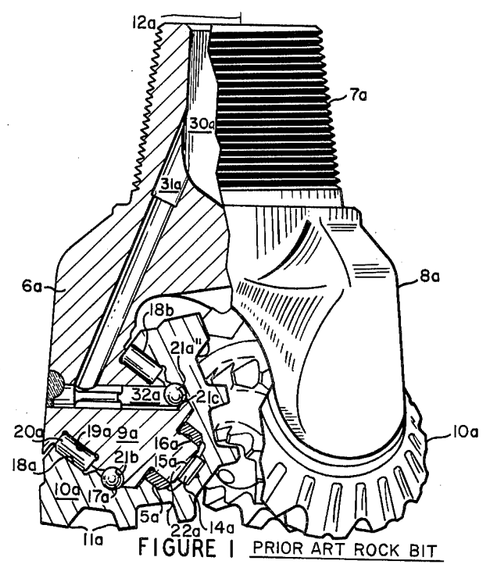
FIGURE 1 is a side elevation view partially in section illustrating a typical three cone rock bit having a conventional combination of roller, ball and journal bearing surfaces, and utilizing air or gas circulated through these surfaces to lubricate and cool them.

Earth boring drills, such as shown in FIGURE 1, typically have a machined shank 7a, generally tapered and threaded as illustrated, which connects the drill to the drill pipe (not shown). This shank is formed at the upper end of the bit body 8a, which is usually fabricated of high strength steel. A multiplicity of bit legs 6a extend downwardly from body 8a, and from each leg 6a a bearing pin 9a extends inwardly and downwardly. A plurality of bearing surfaces are formed on each bearing pin 9a to support a rotatable cutter 10a. Each cutter has protruding teeth 11a, which are either machined on the external surface of the cone, or inserted into holes in the cone (not illustrated), such protrusions being utilized to cut and disintegrate the bore hole bottom as the cones rotate about the longitudinal axis 12a of the bit.

In boring holes in earth formations, large forces are applied to the bit axially through the drill pipe, and are necessarily transmitted through the bearing surfaces of cutter 10a and bearing pin or spindle 9a which forms cooperating surfaces of revolution. The useful life of the drill is determined either by the life of the teeth 11a or the life of the bearing surfaces, whichever fails first. Hence, all available space is utilized on the bearing pin 9a to insure that it does not wear to a useless condition faster than the cone teeth 11a, and FIGURE 1 illustrates generally how this is accomplished.

Figure 2:
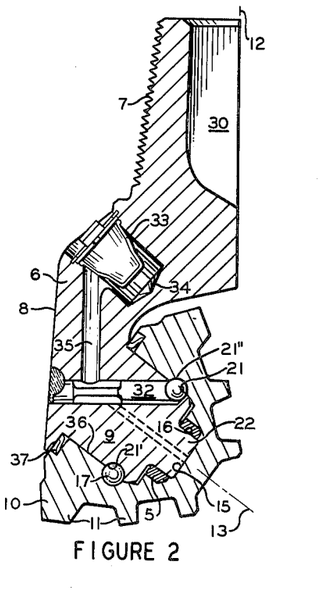
FIGURE 2 illustrates in vertical section one third of a three-cone rock bit which contains all journal bearings except the ball bearing, and a system to lubricate these surfaces with oil or grease.

At the innermost and lowermost part of the bearing cavity formed in the cutter there is inserted by force fit a thrust button 14a of high strength alloy steel which engages and supports the lowermost end 15a of the bearing pin 9a against thrust forces; that is, those which are transmitted between the cutter 10a and the bearing pin 9a parallel to the axis of rotation 13 of the cone. This axis of rotation 13 is shown in FIGURE 2 of the drawings.

Figure 3:
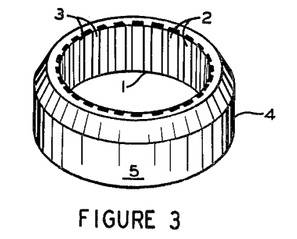
FIGURE 3 illustrates in perspective view a bushing which is press fitted into the lowermost portion of the bearing cavity of a rotatably mounted cone to provide a cylindrical journal bearing surface. As shown, this surface is longitudinally slotted and filled with a soft metal to present areas of hard, wear resistant steel and alternate areas of soft, anti-friction metal inlay, both of which engage the opposed bearing surface and produce superior wearing characteristics.

The adjacent cylindrical bearing surface 16a on the pilot pin portion 22a of the bearing pin 9a engages a mating surface 1 of a bushing 5a of the general configuration illustrated in FIGURE 3. Such bushing 5 is force fitted into a recess in the cone just above the thrust button 14a and, like the thrust button, rotates with the cone.

The next bearing is usually a ball bearing 17a comprising a raceway 21a in the cutter 10a and a raceway 21b in the bearing pin 9a, said raceways retaining rotatable balls 21c having the dual function of supporting thrust and radial loads and retaining the cone on the bearing pin.

Finally, the uppermost bearing is commonly a roller bearing 18a, comprising a raceway 18b formed in the cutter and an opposed raceway 19a in the bearing pin, and into which are assembled rollers 20a.

Where possible, it is advisable to lubricate the bearing surfaces described above to increase their life. This is accomplished by two prevalent methods, one of which is illustrated in FIGURE 1 where numeral 30a designates a central passageway in the bit body 8a. When using air, gas or other compressible fluid as the circulating media, a portion of it travels through this central passageway, drilled hole 31a, generally horizontal passageway 32a, and into ball bearing 17a.

Another method is used if water, drilling mud or other incompressible fluids are circulated, because it is generally advisable to seal the bearings and lubricate them with oil or grease to keep the contaminants in these drilling fluids from the bearings. This may be accomplished by installation of a folded, flexible diaphragm member 33 into a cavity 34, said cavity thereafter being filled with oil or grease. As the drill bit proceeds deeper into the earth, the hydrostatic pressure of the fluid column in the annulus increases, causing the flexible member 33 to unfold. This forces the oil or grease through drilled hole 35, generally horizontal passageway 32, and into the ball bearing 17. Belgium Patent No. 609,287, discloses this system, and additional lubricating systems for rock bit bearings may be seen in U.S. Patents 3,007,750 and 3,007,751. The seal 37 retains the lubricant in the system, and U.S. Patent No. 3,075,781, discloses a seal successfully used to achieve this result.

Within the described series of bearing surfaces, one problem which consistently appears is the rapid wear rate of the bushing 5 and pilot pin 22, undoubtedly resulting from the galling due to the heat created by friction in this difficult-to-cool area. In an attempt to overcome this defect, the invention was applied to the bushing 5 as illustrated in FIGURE 3, in which the numeral 1 designates the bearing surface. Numeral 2 designates the soft, anti-friction metal used to fill slots machined parallel to the longitudinal axis of the bushing, and 3 designates the alternate strips or lands of hardened steel separating and supporting the soft metal.

With reference to the structure illustrated in FIGURE 3, the invention may be described in broad terms as contemplating a bearing surface having alternate areas of hard and soft metal. The hard metal used as a base is of carburized steel, alloy steel or other hard alloy, such as those having an iron or cobalt base. Grooves, slots, or other deep machined indentations are formed in the surface of the hard base metal, and a soft metal having good anti-galling, anti-friction, and other desirable bearing characteristics is inserted into these indentations.

Consequently, there is formed on one bearing surface a composite structure having areas of hard metal with excellent abrasion resistance, and areas of soft metal having excellent anti-galling characteristics. The use of machined slots or indentations provides a deep reservoir which continues to expose additional strata of soft, anti-galling metal. Thus, the structure is operable even after large amounts of wear have resulted because the alternate areas of hard and soft metal continue to be exposed over long periods of time. The hard base metal may be of carburized and heat treated steel having a case depth of .100 inch, for example, and the soft metal filled grooves may be of a similar depth. Consequently, the alternate areas will continue to be exposed until after the wear exceeds this depth.

It is surprising that the strength of the structure is equal to that of a surface having only carburized steel. One skilled in the art would think that the removal of the hard metal having high tensile, shear and (compressive) strength, and filling the slots with soft metal would drastically reduce the load capacity of the structure. Tests subsequently described indicate that this is not the result; on the contrary, the load capacity is large enough to permit application of the invention to rock bit bearings, which are subjected to extremely large loads.

Also surprising is the fact that the soft alloy remains in the machined slots even though little or no bonding between the soft metal inlay and the hard base metal occurs. The art has been concerned with the supposed desirability and necessity of having a proper bond, but the present invention illustrates that this difficult and costly procedure is not necessary. Consider, as an illustration of this point, that the alloy filled gooves 2 in the structure of FIGURE 3 are $1/16$ to $3/32$ inch wide and approximately $3/64$ inch deep. Bonding, if any occurs, is confined to the small areas proximate the juncture of the hard and soft metal. Yet, the structure performs outstandingly even though the area of metal bonded, when compared to the total volume of the soft inlay, is quite small. In addition, specimens were tested having soft silver alloy inserted by mechanical means with no bond, and these performed similarly to the bonded specimens.

FIGURE 3A illustrates an alternate way of machining the grooves in the hard base metal of bushing 5'. As shown, a helical machining cut is made in bearing surface 1', such cut producing a continuous single groove into which the soft inlay 2' is introduced. The structure performed satisfactorily in comparison with the structure of FIGURE 3, indicating that the particular form of deep groove selected is not too critical. Here, the surface land 3' of the base metal is $1/16$ inch wide and the groove width is also $1/16$ inch.

Figure 5:
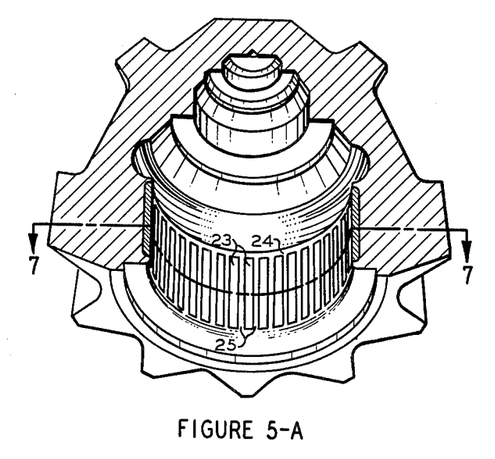
FIGURE 5A illustrates a cylindrical bearing surface of the present invention at the uppermost bearing cavity of the cone, said surface replacing the roller bearing which is commonly located in this area.
FIGURES 5B, 5C, 5D and 5E represent alternate methods of forming the grooves in the bearing surface of FIGURE 5A, it being possible to use any form of machined indentation in practicing the invention.

The invention is applicable to other bearing areas as illustrated in FIGURES 5A through 5E, which show a journal bearing substituted for the usual roller bearing 18 of FIGURE 1. In FIGURES 5A and 5D the soft metal filled indentations 23 and 23''' are machined parallel to the cone axis of rotation 13 (same as axis of bearing pin) leaving lands 25 and 25''' of base metal. The soft metal filled indentations 23 and 23''' terminate before reaching the end of the bearing surface to leave additional lands 24 and 24''' of base metal at the ends of the slots to prevent the soft metal from extruding out of the slots. In addition, the invention has obvious applicability to rock bits which have bearings consisting entirely of the friction type, such as the one disclosed in the patent application of Edward M. Galle, Serial No. 200,359, filed June 6, 1962. Application to such structures would be especially advantageous since very few inlay filled slots are necessary. For example, a test subsequently described shows that four slots, as illustrated in FIGURE 5D, are sufficient to produce outstanding results.

Figure 7:
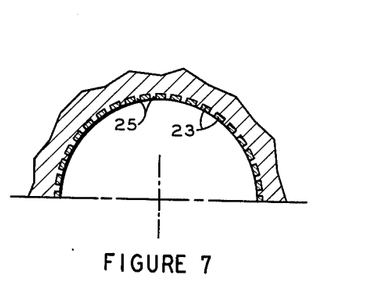
FIGURE 7 is a view in half-section as seen looking in the direction of the arrows 7—7 of FIGURE 5A, showing the arrangement and configuration of the alloy filled slots.
Figure 8:
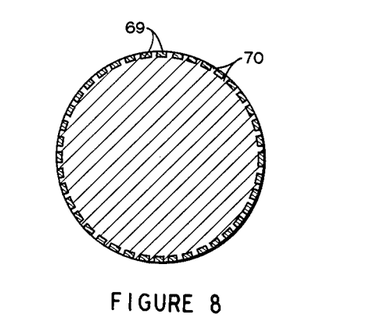
FIGURE 8 is a view in full section illustrating the slots as seen looking in the direction of the arrows 8—8 of FIGURE 6A.

FIGURE 7, a transverse section through the cutter of FIGURE 5A, illustrates in more detail an example of the manner in which the slots are machined in the bearing surface shown in FIGURE 5A. These slots 23 are approximately $1/16$ inch deep and $1/16$ inch wide separated by lands 25 of a similar width.

Figure 10:
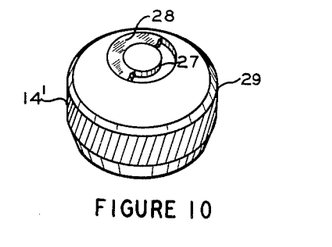
FIGURE 10 illustrates a thrust button, which is usually inserted and retained by press fit in the lowermost area of the cone bearing cavity as shown in FIGURE 1 to engage the end of the pilot pin and resist axial thrust forces. The hard thrust surface of this button contains a groove filled with soft metal according to the present invention.

An illustration of a third rotatable structure to which the invention is applied is shown in FIGURE 10, which shows a circular slot 27 in thrust button 14' containing a filling of soft metal 28. The slot is machined eccentric with the outside circular periphery 29 of the thrust button to bring the soft metal in contact with a large area of the lowermost end 15 of the pilot pin 22 as the button 14' rotates with the cone 10.

In all the above applications the stationary member preferably has a hard surface having good wear resistant characteristics such as carburized steel or steel having an external layer of hard alloy having an iron or cobalt base.

The structure of the embodiment illustrated in FIGURE 3 and to which most of the above description has been directed is obtained in the following manner:

The bushing 5 is machined to approximately its final dimensions, but leaving sufficient stock to permit grinding after heat treatment to insure proper clearance between mating bearing surfaces. The metal of the bushing is American Iron and Steel Institute (AISI) specification 430, this metal being selected for its ability to be hardened after carburization and retain its hardness even after heat from friction develops. 23 straight longitudinal grooves $23/64$ inches deep and $1/16$ inch wide are machined on bearing surface 1 of FIGURE 3 leaving lands 3 which are $1/16$ inch wide, and the bushing is then carburized from .090 to .100 inch case depth in anticipation of severe operating conditions. Silver alloy composed of 15 percent manganese and 85 percent silver is introduced into the slots using standard brazing procedure. The carburized lands are then hardened by oil or air quenching at temperatures ranging from 1700 to 1800 degrees F. in a natural gas atmosphere to produce a hardness of approximately 65 Rockwell "C." The inside diameter of the bushing is then ground to remove imperfections, foreign materials and distortions resulting from the heat treatment.

Figure 11:
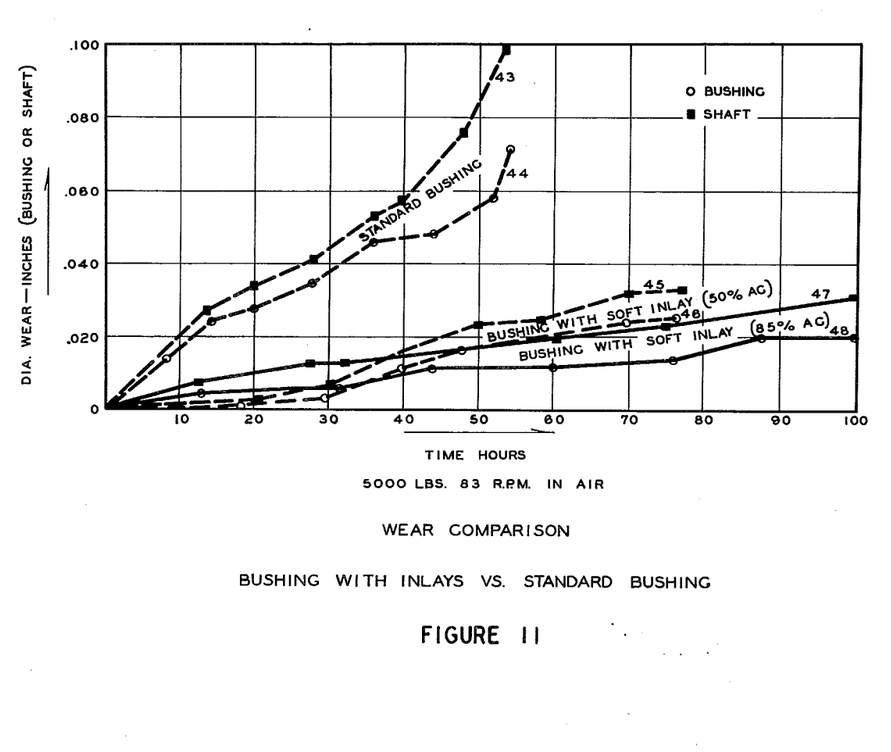
FIGURE 11 is a graph comparing the performance in a media of air of bushings of the type shown in FIGURE 3 and standard bushings, that is, those having a hardened alloy steel bearing surface.

Startling increases in the life of journal bearing manufactured in conformity with the inventive concept are obtained, as are illustrated in FIGURE 11. This graph depicts the results of test wherein bushings as shown in FIGURE 3 (having soft metal inlay) were tested against standard shafts (those having no soft metal inlay), and also the results of standard bushings (those without soft metal inlay) when run against standard shafts. All these structures were tested in a generally horizontal position under 5000 pounds static vertical load at 83 r.p.m., using air as the circulating, cooling and lubricating medium.

The numeral 43 designates a curve showing diametral wear progression of a standard shaft (one having no soft metal inlay) when run against a standard bushing (one having no soft inlay), and the numeral 44 designates the diametral wear progression of the bushing. The shaft was manufactured from AISI 8720 carburized alloy steel having a diameter of .882 inch, and on the shaft surface (subjected to the static load) there was deposited a 1/16 inch thick layer of iron base hardfacing alloy having a hardness of 62 to 65 Rockwell "C." The bushing was manufactured of AISI 430 steel carburized from .090 to .100 inch case depth and hardened by quenching in air from 1800° F. to obtain a Rockwell "C" hardness of 65 to 68. These structures were selected as "standards" in the laboratory test because they are identical in size, material and metallurgical treatment to pilot pins and bushings currently used in many rock bit bearings. Thus, numerals 43 and 44 designate curves showing the amount of diametral wear which would result in identical rock bit bearing surfaces when run under conditions similar to those of the test.

Numeral 45 designates a curve showing the performance of a standard shaft (manufactured identically to the shaft whose wear progression is shown by curve 43) when tested against a bushing having soft metal inlay as is illustrated in FIGURE 3. This bushing was manufactured of AISI 430 steel alloy having 23 slots 1/16 inch wide and 3/64 inch deep, leaving lands of base metal 1/16 inch wide. It was carburized from .090 to .100 inch case depth prior to the application of a soft alloy composed of 50 percent silver, 15½ percent copper, 15½ percent zinc, 16 percent cadmium and 3 percent nickel. Curve 46 indicates the diametral wear of this bushing when run against the shaft of curve 45 under the same conditions present when the structures of curves 43 and 44 were tested.

Numeral 47 indicates the performance of a shaft identical to those described in connection with curves 43 and 45 when tested in conjunction with a bushing similar to that of curve 46, but having a soft inlay of 85 percent silver and 15 percent manganese. Curve 48 illustrates the wear progression of the mating bushing when tested under conditions identical with those of the other test reported in FIGURE 11.

Hence, FIGURE 11 indicates the superior wear characteristics achieved by application of the invention to journal bearing surfaces when air is used as the circulating medium. Comparing wear for the three assemblies after 50 hours running time, it will be seen that the total diametral wear of the standard assembly is 0.140 inch (.055"+.085"), whereas the total such wear for the assembly using 50% silver alloy in the bushing is only 0.043 inch, and for the 85% silver alloy in the bushing, 0.031 inch.

Figure 12:
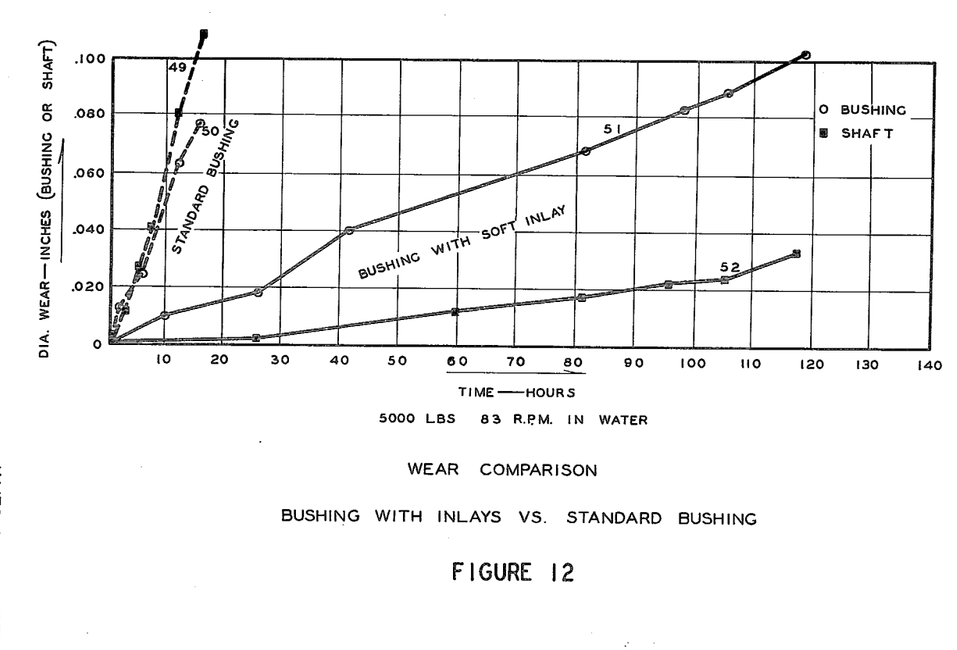
FIGURE 12 is a graph showing test results of similar structures, but tested in a media of water.

When using water as the circulating medium, the same outstanding results are achieved, as are indicated in FIGURE 12. Here, numerals 49 and 50 indicate respectively the performance of a standard shaft and standard bushing (materials and metallurgical treatment are identical to the standard specimens, the performance of which is shown in FIGURE 11) tested under 5000 pounds load and at 83 r.p.m. The curve 51 illustrates the performance under the same conditions of a bushing manufactured identically to those heretofore described having 23 longitudinal slots filled with an 85 percent silver, 15 percent manganese alloy. Numeral 52 refers to a curve showing the performance of the mating, standard shaft.

Consequently, the results depicted by FIGURE 12 encourage application of the invention to bearings operating in a medium of water.

Figure 13:
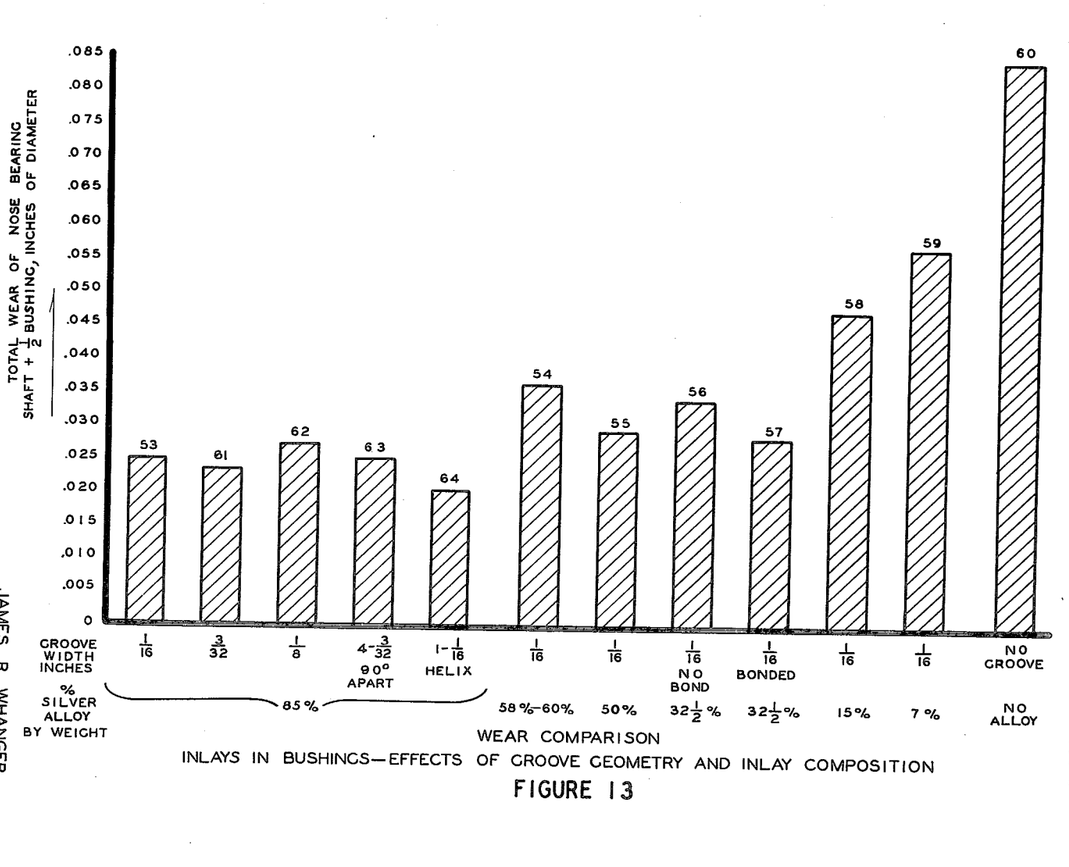
FIGURE 13 is a bar graph showing performance of the invention having a variety of slot configurations, and in addition, the effect of the percent silver contained in the soft metal inlay.

Since the test results illustrated in FIGURE 1 indicated that silver alloy having 85 percent silver was superior to alloy having only 50 percent silver, further tests were conducted to determine the relationship of bearing performance to the percent silver. FIGURE 13 indicates the results of these tests, and in addition shows the effect of altering the machined indentation geometry. All shafts were standard, as have been heretofore described, and the bushings were identical to those previously described except for intentionally produced variations in machined groove and alloy composition. All specimens were tested with 6000 pounds static load at 83 r.p.m. using air as the circulating medium. To simplify the presentation of data, the combined diametral wear of the shaft and one half the bushing diametral wear were shown in FIGURE 13.

The numerals 53 through 60 designate the test results of specimens identical except for the soft inlay composition. The purpose of presenting these results is to indicate the effect on performance of changes in the percent silver when using silver alloy. Preferably in these tests, all alloys would contain the same elements in combination with silver, the only variation being the percentages of each. Unfortunately, silver alloys of this nature are not readily available. Hence, it was necessary to test alloys which were available, and for this reason the non-silver alloying elements are different. Thus, numeral 53 designates the performance of a specimen having an alloy of 85 percent silver and 15 percent manganese. The composition of the numeral 54 specimen is 58–60 percent silver, 26–28 percent copper, 11–13 percent zinc and 1–2 percent tin; numeral 55, 50 percent silver, 15½ percent copper, 15½ percent zinc, 16 percent cadmium and 3 percent nickel; numerals 56 and 57, 31½ percent silver, 34 percent copper, 15½ percent zinc and 19 percent cadmium; numeral 58, 15 percent silver, 80 percent copper and 5 percent phosphorous; numeral 59, 7 percent silver, 8 percent tin and 85 percent copper; numeral 60, no silver and no grooves (i.e., these are standard shafts and bushings).

Even though the non-silver elements in the alloys varied, however, it is still obvious that the greater the silver content, the better the performance.

Alterations in the geometric form of the deep alloy filled slots have surprisingly insignificant influence on the performance of these bearings. Numeral 53 designates the results when using 23 grooves 1/16 inch wide with 1/16 inch wide lands of base metal; numeral 61, 17 grooves 3/32 inch wide with 3/32 inch lands; numeral 62, 11 grooves 1/8 inch wide with lands 1/8 inch wide; numeral 63, 4 grooves 3/32 inch wide 90 degrees apart with lands approximately 9/10 inch wide; numeral 64, 1/16 inch wide helical groove machined on a pitch of 2½ grooves per axial inch. All grooves in bar graphs 53 and 61 to 64 were 3/64 inch deep and had soft alloy of 85 percent silver and 15 percent manganese. Thus, the results of the test indicate little difference in performance of bushings having different groove configurations. FIGURES 5A, 5B, 5C, 5D and 5E illustrate a few of the possible types of machined indentations that may be used for main journal bearings in view of these results.

Numerals 56 and 57 designate results of test which show that bonding between the soft alloy and the base metal is unnecessary. The bushings designated by numeral 56 had soft alloy composed of 31½ percent silver, 34 percent copper, 15½ percent zinc and 19 percent cadmium, which was inserted while in the solid state at room temperature into 1/16 inch wide slots. The bushing of numeral 57 had the same alloy bonded to the base metal by spinning the structure while the soft alloy was in the molten condition as will be hereinafter described, and as is apparent, the bushing 56 with the mechanically inserted alloy compared satisfactorily with bushing 57.

Figure 14:
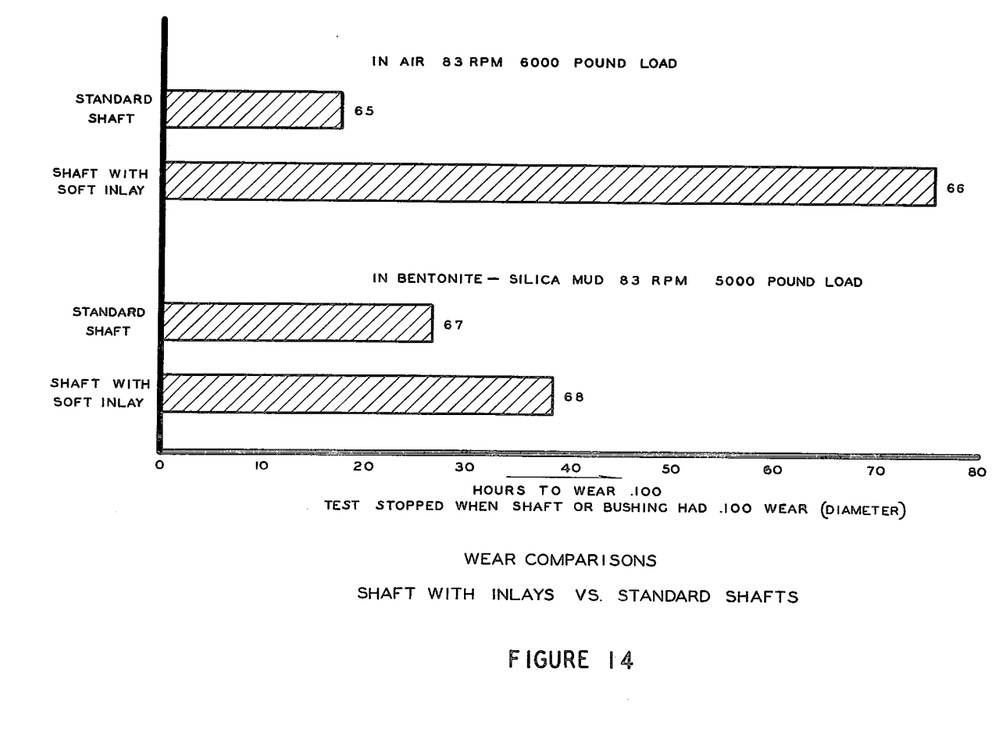
FIGURE 14 is a bar graph showing test results of the stationary journal surface as illustrated in FIGURE 4 when run in a media of air and also in drilling mud of bentonite water slurry with silica flour, which is common in oil well drilling.

It was observed that bearings having the present invention did not perform exceptionally well when the surrounding medium contained large amounts of abrasive contaminants. It was thought that abrasive particles tended to become embedded in the soft inlay, thus creating an abrasive laden surface which wore the contact area of the stationary bearing surface. In an attempt to transfer the wear to the larger contact area (the internal peripheral surface) of the rotating member, soft metal filled slots were formed in the stationary member in specimens similar in appearance to the protruding portion of the structure illustrated in FIGURE 4. In these specimens the rotatable member was a standard bushing of AISI 430 steel as has been heretofore described. The shafts were of AISI 8720 steel heat treated and hardfaced in the manner previously described but having soft inlay deposited in longitudinal slots by brazing, the inlay being composed of 85 percent silver and 15 percent manganese. FIGURE 14 designates the results of test on specimens mounted for rotation about a horizontal axis and with an applied vertical static load of 6000 pounds and a rotational speed of 83 r.p.m. Numerals 65 and 66 refer respectively to the results obtained with standard shafts (no soft inlay) and shafts having the soft metal inlay when tested in a circulating medium of air. In addition, numerals 67 and 68 indicate respectively the results produced by standard shafts and those having soft metal inlay when tested in a circulating medium of bentonite-silica mud, which is a fluid commonly circulated through the pipe and bore hole while drilling oil wells. This medium has contaminants which enter the bearings of unsealed rock bits, and thus is a consistently occurring practical problem.

As numeral 68 in FIGURE 14 indicates, the invention when applied to the stationary bearing surface produces a definite improvement when using a contaminant-laden circulating medium. When air is circulated through the bearing, an improvement of large magnitude is achieved as indicated by numeral 66. Thus, the feasibility of applying the invention to stationary bearing surface is proved, and FIGURES 4, 4A, 6A and 6B illustrate a few of the possible slot geometries.

Since the invention was successfully applied to both the rotating and stationary bearing surfaces, a test was conducted to determine the performance of a bearing having the invention applied simultaneously to both surfaces. The rotating surface was a bushing with 85 percent silver, 15 percent manganese alloy applied to slots 1/16 inch wide and 3/64 inch deep, separated by 1/16 inch wide lands. The base metal was a layer of iron based hardfacing covering an AISI 8720 steel shaft, and was heat treated in the manner previously described. A helical groove approximately 1/16 inch wide was ground in the hardfaced base metal, making one complete spiral in 360 degrees. This specimen when tested in air wore similarly to the specimen depicted by bar 53 of FIGURE 13, showing that the invention may be applied simultaneously to both rotating and stationary bearing surfaces.

Tests were conducted with successful results to determine the feasibility of using the invention on surfaces lubricated with oil or grease. The structures used in these tests were similar to the earth boring drill of FIGURE 2 in which the numeral 36 designates the journal surface to which the invention was applied. The system was filled with lubricant and sealed at the back of the cone with seal 37, which comprises a dish shaped metal spring coated with a resilient material.

Figure 6:
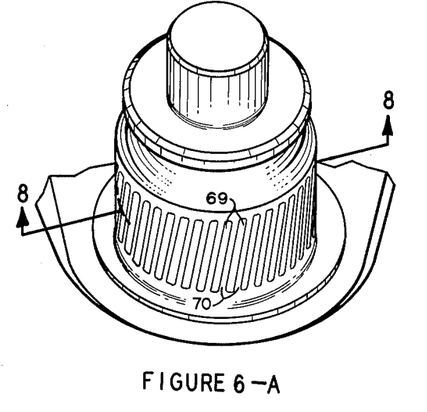
FIGURES 6A and 6B show alternate applications of the invention whereby the soft, anti-friction metal inlays are employed on the stationary shaft in the area where conventional rock bits utilize a roller bearing.

These drills were run under conditions common to earth boring drills in general, and the results show that as long as the seal 37 functioned properly, the journal bearings would perform similar to drills having roller bearings, such as shown in FIGURE 1. Thus, the rollers can be eliminated, adding strength and simplicity to rock bit bearings. Several types of specimens were tested, including some with inlay-filled slots in the main cutter bearings, similar to FIGURES 5A, 5B and 5C, and very little difference in performance was observed, as in the similar tests on nose bearings described above. However, upon failure of the seal 37, the soft inlay extruded from the slots in the rotating cutters faster than is desirable, probably because of the contaminants in the drilling mud. The laboratory test previously described indicated that application of the invention to the stationary member as shown in FIGURES 6A and 6B would help overcome this condition. As illustrated, numeral 69 represents the soft alloy filled slots and numeral 70 represents the alternate areas of hard, wear resistant base metal.

Figure 4:
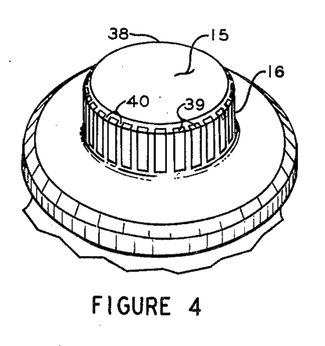
FIGURE 4 represents an alternate method of practicing the invention by application of soft, anti-friction metals in slots formed in the hard, non-rotating forward portion of the journal shaft, commonly called the "pilot pin."

An alternate means of practicing the invention on stationary members is illustrated in FIGURE 4A, where the numeral 38 designates the stationary shaft having a journal bearing comprising strips of soft, anti-galling inlay 39, hardened steel lands 40, and a circumferential band 40' of hard alloy, such as those having an iron or cobalt base. This structure is obtained by application of the hard alloy and machining the grooves through this material and the steel. The soft inlay is applied to the slots as in other structures and then ground. Since the alloy strip 40' is hard, the alternate strips of hard and soft metal on one surface is obtained as contemplated by the invention. Of course, the soft alloy 39 may be inserted in hardened steel without using the hard alloy 40', as is shown in FIGURE 4.

Figure 9:
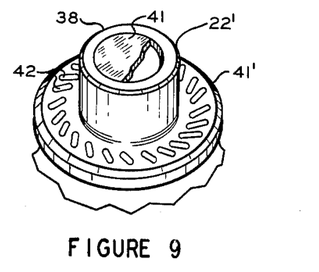
FIGURE 9 represents the metal filled slots of the invention disposed on the thrust flange which intersects the pilot pin of the stationary shaft. Shown also is the extremity of the pilot pin, having a cavity filled with conventional hard metal alloy of the "Stellite" series alloy as is generally done on rock bit pilot pins.

Still another application of the invention is illustrated in FIGURE 9 which is an oblique view of the pilot pin indicated by numeral 22'. In such structures it is common to have an application of hard metal of the cobalt based alloy "Stellite" series, as indicated by numeral 41, to resist thrust loads transmitted by the thrust button 14' shown in FIGURE 10. The soft metal inlay could be applied in this area in view of the successful application to other stationary bearing surfaces. Another surface sometimes used to resist thrust loads is indicated by the number 41', and is commonly referred to as the "thrust flange." The invention may be utilized on this surface by application of soft metal inlay 42 in slots such as those illustrated.

As has been previously indicated the best results are obtained by using a soft inlay material having a high percentage of silver, or by using silver without additional elements. Pure silver performs in all respects similar to 85 percent silver and 15 percent manganese alloy but is harder to obtain and is more expensive. However, other metals low in the electromotive series are within contemplation of the invention provided they are soft metals having anti-friction or anti-galling characteristics, such as lead, tin copper, antimony, rhodium, platinum, palladium, gold, indium, bismuth, beryllium, zinc, aluminum, etc., singularly or in combination.

The example of manufacture previously given indicates that the soft inlay is brazed into the slots in the carburized bearing surface, and then the hard base metal structure is hardened by oil or air quenching at a temperature of 1700–1725 degrees F. This procedure is successful if the inlay material has a melting temperature higher than 1700 degrees F., such as silver or alloy of 85 percent silver and 15 percent manganese. Otherwise, the alloy will melt during the quenching process. This procedure is also successful if the soft alloy has a melting temperature so low that it can be melted into the slots after the base metal is hardened without tempering the base metal. Lead and tin, for example, melt respectively at 621 degrees F., and 449 degrees F., both these temperatures being sufficiently low as not to affect the hardness of the base metal. If the metals selected do not comply with the foregoing requisites, the base metal will be softened, possibly to the extent that it looses its wear resistant and anti-abrasion characteristics.

Consequently, a novel process was developed to overcome this limitation. This process comprises the introduction of the soft metal into the carburized bushing in a loose, solid state and sealing both ends of the structure. The structure is then positioned in a lathe or other machine capable of spinning the structure about its longitudinal axis. After the piece is spun, usually at a speed varying from 700 to 900 r.p.m., it is heated to a temperature sufficient to melt the enclosed soft metal and to a temperature from which the hard metal may be quenched. The centrifugal force created by the rotational movement presses the molten metal into the slots, and a subsequent fluid quench by a stream directed against the rotating structure solidifies the soft metal and hardens the base metal.

In addition, the soft inlay may be introduced by mechanical means into the machined slots as an alternate method of manufacturing the invention. This process is particularly advantageous with alloys having a cadmium base since this element when melted emits gases having cumulative adverse effects on humans because of its toxic nature. Encouraging results were not obtained by use of a cadmium based alloy, but the utility of a mechanically inserted inlay was nevertheless proved feasible. Silver alloy, for example, was mechanically introduced into the slots successfully, as is shown by the results depicted by numeral 56 in FIGURE 13. Therefore, this may be utilized as an alternative method of applying the soft metal if for some reason one of the other two methods is not feasible.

Having described the invention and how it may be practiced, the advantages are apparent. Of particular importance is the combination on one bearing surface of alternate strips of metals giving a composite surface having excellent wear and abrasion resistance, and anti-galling, anti-friction characteristics.

In addition, the use of soft metal inlays which are of considerable depth relative to the depth of the hard metal base preserves and retains the advantages of this composite material even after large amounts of wear have occurred.

Furthermore, the discovery that particles of soft metal inlay spread over the bearing surface to produce outstanding results, enables the application of soft metal without the requirement of bonding between the hard and soft metals. Also, this discovery permits the use of structures having relatively few soft metal filled slots and consequently, smaller amounts of the expensive soft metals are required.

The invention permits substitution of journal bearings for roller or ball bearings in such structures as rock bit bearings. This adds to the strength and durability of the assembled bit, giving the bearings a life more nearly equal to that of the cutting structure.

What is claimed is:

1. A friction bearing of large load capacity between a pair of relatively rotatable members in which at least one of said members has a quantity of indentations extending from the bearing surface thereof, said quantity of indentations is filled with a soft metal having anti-galling characteristics, and the balance of said bearing surface is a hard metal of high wear resistance, the hardness and wear resistance of said hard metal being comparable to those of a carburized and hardened steel.

2. A friction bearing of large load capacity between a pair of relatively rotatable members wherein at least the outer surface of one member is a hard, wear-resistant material containing a number of deep surface indentations filled with a soft anti-galling material, the hardness and wear resistance of said surface material being like those obtained by carburizing and heat hardening a low carbon chromium stainless steel.

3. In a journal bearing wherein one member rotates about a second member and each member includes a bearing surface facing the bearing surface of the other, and wherein the material of at least one of the facing surfaces has the hardness and wear resistance of a carburized and heat hardened alloy steel, *the improvement comprising* indentations in said one bearing surface and inlays of soft, anti-galling metal in said indentations.

4. A composite journal bearing comprising:
   lands of hard, wear resistant metal spaced from each other by grooves,
   and inlays of soft, anti-galling metal filling said grooves in the hard metal approximately flush with said lands, said hard metal having a hardness and a wear resistance of the order of those of a carburized and heat hardened alloy steel.

5. A composite journal bearing surface comprising alternate areas of hard, wear resistant metal and soft, anti-galling metal, said alternate areas having the form of a helical grooves in the hard metal filled with said soft, anti-galling metal, said hard metal being a carburized and heat hardened steel and said filler metal being a silver alloy.

6. A composite journal bearing surface comprising a base metal selected and treated for very high hardness and wear resistance, comparable to those of a carburized and heat treated alloy steel, said base metal having indentations therein filled with inlays having the softness and anti-galling nature of a high silver alloy.

7. In a rotary drill bit comprising a head having inwardly extending shafts thereon and rolling cutters rotatably mounted on bearings on said shafts, *the improvement comprising* having at least some of said bearings in the form of facing pairs of journal surfaces on said shafts and cutters and at least one of the pair of said journal surfaces having the hardness and wear resistance of a carburized and heat hardened alloy steel and indentations in said one surface filled with a metal having the softness and anti-gallingness characteristic of silver.

8. In a rolling cutter for earth boring drills comprising a body having externally protruding cutting elements and internal journal bearing surfaces, the improvement comprising at least one journal surface having areas of base metal having a hardness and resistance to abrasion characteristic of a carburized and heat treated alloy steel and alternate areas of soft metal having the anti-galling nature of silver disposed in indentations in said base metal.

9. In a rock bit bearing having friction and anti-friction bearing surfaces, and wherein at least one of said friction bearing surfaces is a carburized and heat treated steel, the improvement comprising the addition to grooves in said at least one friction surface of a soft, anti-galling silver alloy inlay, thereby giving a composite surface of hard and wear resistant areas alternating with soft anti-galling areas.

10. In a rock bit bearing having a plurality of bearing surfaces including a hard, abrasion-resistant surface on a thrust button to resist forces generally parallel the cone axis of rotation, *the improvement comprising* the addition of soft, anti-galling metal inlay to at least one slot in the bearing surface of the thrust button to produce a composite surface having abrasion resistance and resistance to galling, said thrust button being defined by a material having the hardness and wear resistance of a carburized and heat treated alloy steel.

11. In a rock bit bearing having a plurality of bearing surfaces including a bushing frictionally engaging a pilot pin, *the improvement comprising* the addition of soft, anti-friction, anti-galling inlay in at least one groove in the hard, abrasion resistant bearing surface of the bushing, the material defining said abrasion resistant surface of the bushing having a hardness and wear resistance of the order of those of a case hardened alloy steel and said metal filling the grooves having the softness and anti-galling nature of the order of those of silver alloy.

12. In a rock bit having bearing surfaces including a bushing rotatably engaging a pilot pin, *the improvement comprising* a hard, abrasion resistant surface on said pilot pin and a soft metal inlay in at least one groove machined inlay in at least one groove machined in said pilot pin surface, said surface having the hardness and wear resistance of a carburized and quench hardened steel and said inlay having the softness and anti-friction nature of a silver alloy.

13. In a rotatable member including a steel bushing carburized and heat treated to define a bearing surface of high hardness and high wear resistance, said bearing surface being disposed to frictionally engage an opposed bearing surface of a stationary member, the improvement comprising soft, anti-galling metal inlay introduced into at least one slot in the bearing surface of the bushing.

14. A composite journal bearing surface comprising:
(A) areas defined and underlaid by a carburized, wear resistant heat treated steel,
(B) and alternate areas of soft, anti-galling silver inlay disposed in machined indentations in the surface of said heated treated steel.

15. In the thrust flange of a rock bit bearing pin, a composite bearing surface comprising alternate areas of soft, anti-galling metal and hard, wear-resistant metal, said anti-galling metal being contained in grooves in said hard, wear-resistant material, the softness and anti-galling characteristics of said groove contained metal being comparable to those of silver and the hardness and wear resistance of the other metal being comparable to those of a carburized and heat hardened steel.

16. In a rotary earth boring drill having a head with at least one depending bearing spindle and a rolling cutter rotatably mounted on said spindle, *the improvement comprising* a friction type main bearing between said cutter and spindle for radial loads, each of said cutter and spindle having a surface of revolution confronting the like surface of the other for frictional contact therewith, at least one of said surfaces being defined by a matrix metal of hard, abrasion resistant material containing a quantity of grooves, and a soft, anti-galling metal in said grooves, said matrix metal having a hardness and wear resistance of the order of those of a case hardened alloy steel and said metal filling the grooves having the softness and anti-galling nature of the order of those of silver alloy.

17. The structure of claim 16 in which said anti-galling metal is predominantly silver.

18. The structure of claim 16 in which said matrix material is a surface of carburized and heat treated steel and said anti-galling metal is predominantly silver.

19. In a rock bit having a friction type main bearing for radial loading, said bearing being between a pair of confronting surfaces of a fixed member and a rotary member, *the improvement comprising* a hardened and carburized surface on one of said members extending internally from its confronting surface and a soft, anti-galling silver alloy contained in slots formed in said surface.

20. In a device including a fixed member and a rotatable member mounted on the fixed member, there being a pair of bearing surfaces on said members which are symmetric about a common axis and adapted for the transmission of heavy loads between one another, one said bearing surface on each member confronting the other in face-to-face relation for frictional contact during rotation, *the improvement comprising* the material at and underlying at least one said member at its bearing surface being a composite material consisting of a matrix metal having the hardness and wear resistance of carburized and heat treated steel and a number of inlays of soft, anti-galling metal secured in a like number of grooves in the surface of said matrix metal, said anti-galling metal having the anti-friction characteristics of silver.

References Cited by the Examiner

UNITED STATES PATENTS

| | | | |
|---|---|---|---|
| 1,122,565 | 12/1914 | Bache | 308—239 |
| 1,637,317 | 7/1927 | Shoemaker | 308—239 |
| 1,983,283 | 12/1934 | Garfield | 308—8.2 |
| 2,104,819 | 1/1938 | Schlumpf | 308—8.2 |
| 2,329,483 | 9/1943 | Queneau | 308—237 |
| 2,513,634 | 7/1950 | Francis | 308—8.2 |
| 2,595,904 | 5/1952 | Swart | 308—8.2 |
| 2,599,726 | 6/1952 | Schluchter | 308—241 |
| 2,823,083 | 2/1958 | Welton | 308—8.2 |
| 3,062,599 | 11/1962 | Campbell | 308—239 |
| 3,113,630 | 12/1963 | Williams | 175—371 X |

FOREIGN PATENTS 1,053,319   2/1954   France.

DON A. WAITE, *Primary Examiner.*

FRANK SUSKO, ROBERT C. RIORDON, *Examiners.*